United States Patent
Weihrauch et al.

(10) Patent No.: US 7,365,466 B2
(45) Date of Patent: Apr. 29, 2008

(54) ROTOR FOR AN ELECTRICAL MOTOR

(75) Inventors: Niels Christian Weihrauch, Flensburg (DE); Peter Scavenius Andersen, Soenderborg (DK)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 11/311,597

(22) Filed: Dec. 19, 2005

(65) Prior Publication Data

US 2006/0131980 A1    Jun. 22, 2006

(30) Foreign Application Priority Data

Dec. 20, 2004   (DK)   ............... 2004 01959

(51) Int. Cl.
*H02K 21/12*   (2006.01)
(52) U.S. Cl. ............ 310/156.78; 310/156.78; 310/261
(58) Field of Classification Search .......... 310/156.53, 310/55, 74–79, 81, 210–212
See application file for complete search history.

(56) References Cited

U.S. PATENT DOCUMENTS

| | | | |
|---|---|---|---|
| 4,064,410 A * | 12/1977 | Roach .................. | 310/211 |
| 4,639,627 A | 1/1987 | Takekoshi et al. ........... | 310/42 |
| 5,140,211 A * | 8/1992 | Ucida .................. | 310/156.61 |
| 5,185,918 A * | 2/1993 | Shafer, Jr. .................. | 29/598 |
| 5,369,325 A | 11/1994 | Nagate et al. | |
| 5,719,457 A * | 2/1998 | Helfer .................. | 310/211 |
| 5,864,191 A | 1/1999 | Nagate et al. | |
| 6,006,418 A | 12/1999 | Takeda et al. | |
| 6,031,312 A * | 2/2000 | Zoche et al. .......... | 310/211 |
| 6,552,462 B2 | 4/2003 | Sakai et al. | |
| 6,700,270 B2 | 3/2004 | Yanashima et al. | |
| 6,707,216 B2 | 3/2004 | Han et al. | |
| 6,727,627 B1 * | 4/2004 | Sasaki et al. ............ | 310/211 |
| 6,727,628 B2 * | 4/2004 | Shimada et al. ........... | 310/216 |
| 6,891,300 B2 | 5/2005 | Noda et al. | |
| 6,933,647 B2 | 8/2005 | Kuemmlee et al. | |

(Continued)

FOREIGN PATENT DOCUMENTS

DE   102 54 967   6/2004

(Continued)

*Primary Examiner*—Darren Schuberg
*Assistant Examiner*—Naishadh N Desai
(74) *Attorney, Agent, or Firm*—McCormick, Paulding & Huber LLP (57) ABSTRACT

The invention provides a rotor for an electrical motor, a tool for making a rotor core and a method of making the rotor. The rotor could be incorporated e.g. in a line-start motor and comprises a squirrel cage and magnet located in a rotor core. The magnets are, in one end of the rotor, secured by an end plate with apertures which are larger than the magnet openings, and the end plate is indexed relative to the magnet slots such that a first portion of openings into the magnet slots is in communication with the aperture and such that a remaining, second, portion of the magnet slots is covered by the end plate. In one aspect, the end plate forms an integrated part of the rotor core and comprises openings cooperating with conductor slots to form through-going passages for conductors of the squirrel cage. In that way, the end plate is held in a completely fixed position by the squirrel cage which is moulded directly onto the core and into the conductor slots.

10 Claims, 5 Drawing Sheets

U.S. PATENT DOCUMENTS

| | | |
|---|---|---|
| 7,112,908 B2 | 9/2006 | Takita et al. |
| 7,183,686 B2 | 2/2007 | Sasaki et al. |
| 2004/0004407 A1 | 1/2004 | Laurent et al. |
| 2006/0131977 A1 | 6/2006 | Weihrauch et al. |
| 2006/0158056 A1 | 7/2006 | Weihrauch et al. |

FOREIGN PATENT DOCUMENTS

| | | |
|---|---|---|
| JP | 3124238 | 5/1991 |
| JP | 9-233750 | 9/1997 |
| JP | 9308195 | 11/1997 |
| JP | 11-355985 | 12/1999 |
| JP | 2000-004550 | 1/2000 |
| JP | 2000232760 | 8/2000 |
| JP | 2001-268829 | 9/2001 |
| JP | 2001346368 | 12/2001 |
| JP | 2003102151 | 4/2003 |
| JP | 2003-209941 | 7/2003 |
| JP | 2003235189 | 8/2003 |
| JP | 2004129369 | 4/2004 |
| JP | 2004-364349 | 12/2004 |

* cited by examiner

ROTOR FOR AN ELECTRICAL MOTOR

CROSS-REFERENCE TO RELATED APPLICATIONS:

Applicant hereby claims foreign priority benefits under U.S.C. § 119 from Danish Patent Application No. PA 2004 01959 filed on Dec. 20, 2004, the contents of which are incorporated by reference herein.

FIELD OF THE INVENTION

The invention relates to a rotor for an electrical motor e.g. a line start motor and to a method of making the rotor. In particular the invention relates to a rotor with a core made from a stack of sheets each comprising conductor openings and magnet openings which, in combination with corresponding openings of the other sheets in the stack, form conductor slots and magnet slots extending between axially opposite end faces through the rotor. The rotor further comprises an end plate for securing a magnet in the magnet slots. To reduce magnetic short circuiting, the end plate is provided with an aperture in communication with the magnet slots.

BACKGROUND OF THE INVENTION

In one type of commonly used electrical motors, a stator comprises windings in which an electrical field creates a rotating magnetic field. Inside, or circumferentially outside the stator, a rotor is rotationally attached to rotate under influence of the magnetic field. Various principles exist. In a synchronous motor, the rotor is magnetised, or comprises a set of permanent magnets. This type of motor is simple and reliable and the rotational speed of the rotor corresponds to the rotational speed of the electrical field in the windings of the stator. In certain applications, however, the synchronous motor has an inappropriate start-up characteristic.

In asynchronous motors, the rotor comprises substantially longitudinally extending windings which in axially opposite ends of the rotor are interconnected by short circuit rings. Typically, a rotor for an asynchronous motor comprises a rotor core made from a magnetically conductive material and a squirrel cage wherein the windings and short circuit rings are moulded in one piece from an electrically conductive material, e.g. aluminium. The rotor could be laminated from sheets of a metal, wherein each sheet comprises an opening which, in combination with other sheets, form conductor slots extending axially throughout the rotor. After the assembly of the sheets into a rotor core, conductive bars constituting the windings are moulded directly into the conductor slots using the slots as a mould, and the short circuit rings are moulded in one piece with the bars. In use, an electrical current is induced into the windings of the rotor by the magnetic field generated in the stator, and due to a shift between the electrical field in the windings of the stator and in the windings of the rotor, the rotor starts to rotate. Such motors have good start-up characteristics but in order to continue the induction of an electrical field into the windings of the rotor, the electrical field of the stator must continuously move relative to the windings of the rotor. The rotational speed of the rotor will therefore always be lower than the rotational speed of the electrical field in the stator. To increase the speed of the rotor, a rotor for a line-start motor comprises, in addition to the windings, a set of permanent magnets, and a line-start motor thereby combines the advantages of synchronous and asynchronous motors.

In manufacturing of line-start motors, the fixation of permanent magnets in the rotor core is a sensitive process. Since an increased temperature during moulding of the squirrel cage may influence or even destroy the permanent magnets, it is desired to insert the magnets into the core after the moulding of the squirrel cage. Therefore, the core is typically made with slots for the magnets and with openings in an end face of the rotor. The openings are large enough to allow the magnets to be inserted into the slots after the moulding process. When the magnets are inserted into the slots, they must be solidly fixed to avoid displacement of the magnets during rotation of the rotor. For that purpose, some rotors comprise terminating end plates which close the openings or at least reduce the size of the openings to prevent the magnets from falling out of the slots. In the heretofore known motors, the end plate is joined e.g. by a traditional rivet or nail which extends through an opening in the endplate and down into the core of the rotor wherein the rivet is anchored, or the end plate is glued onto the end face. In any case, the attachment of the end plate to the end face of the rotor increases the complexity and costs of the manufacturing of the rotor.

BRIEF SUMMARY OF THE INVENTION

It is an object of the invention to improve the existing motors, and in particular to facilitate a more efficient way of fastening magnets in a rotor for a line start motor. Accordingly, the invention in a first aspect provides a rotor of the kind described in the introduction wherein the aperture is larger than the magnet openings, and the end plate is indexed relative to the magnet slots such that a first portion of openings into the magnet slots is in communication with the aperture and such that a remaining, second, portion of the magnet slots is covered by the end plate. Since the aperture is at least of the size of the cross-section of the cavity, short circuiting of the magnet can be prevented or reduced when compared with end plates of the known kind.

The end plate may comprise conductor openings which cooperate with the conductor slots to allow the conductors to extend through the conductor openings of the end plate. Due to the conductor openings of the end plate, the end plate may be joined with the rotor core before the squirrel cage is moulded, and after the squirrel cage is moulded, the conductors extend through the slots in the core and through the conductor openings in the end plate. The end plate may thus form an integrated part of the rotor core, and further fixation of the end plate to the core may be unnecessary. Accordingly, the separate steps of attaching the end plate, e.g. by riveting, could be avoided.

The core and the end plate could be made from plates of a magnetically conductive material, e.g. an iron containing material. The end plate could be made from the same material as the other plates. Furthermore, all the sheets forming the core, including the end plate, could be made and interlocked in an interlocking process in which the plates, one by one is stamped out of a piece of a sheet material and subsequently joined with previously produced plates. The rotor core thereby obtained comprises conductor slots and magnet slot extending between axially opposite end plates, and in a first end face, the end plate secures magnets from falling out. The magnets, however, should preferably not be inserted until after the moulding of the squirrel cage. Accordingly, the rotor core and the end plate may be arranged in an injection moulding machine in which the squirrel cage is moulded with the conductors directly into the conductor slots and through the openings in the end plate. When the rotor has cooled down after the moulding process, magnets are inserted into the slots from an opposite second end face. Subsequently, closing means, e.g. an alternative end plate, is attached to the second end face to secure the magnets from falling out through that end. The alternative end plate is attached to the rotor after the moulding of the squirrel cage, and in order to fit radially inside the short circuit ring, it may preferably have a smaller radial size than the end plate which comprises the conductor openings, and in this embodiment, conductor openings are meaningless in the alternative end plate.

If the end plate is made from a magnetically conductive material, the magnets which are secured in the slots by the end plate may short circuit whereby the magnetic field from the magnets is reduced. In order to reduce short circuiting of the magnets, the end plate may comprise at least one aperture in addition to the conductor openings. The aperture should be located relative to the magnet slots such that a first portion of the magnet slots is in communication with the aperture and such that a remaining, second, portion of the magnet slots is covered by the end plate. In one embodiment, the aperture has an area which is larger than the area of the openings of the cavity, and in one embodiment, the aperture is arched, e.g. located symmetrically around a centre axis.

The magnet slots could have a shape which exactly matches the shape of the magnets to narrowly enclose the magnets. Preferably, the magnets and the magnet slots have rectangular cross sectional shapes, and preferably the magnet slots extend through the rotor core from a first axial end face to an opposite second axial end face with a uniform cross-sectional size and shape.

In a second aspect, the invention provides an interlocking tool for making a rotor in accordance with the first aspect. The tool comprises:

punching means for making sheets each comprising conductor openings and magnet openings,
  punching means for making an end plate comprising conductor openings,
  stacking means adapted to:
    stack the sheets such that the conductor openings and magnet openings of a plurality of sheets in combination form conductor slots and magnet slots extending axially between first and second axially opposite end faces of the rotor, and
    position the end plate at one end face of the stack of sheets such that the conductor openings of the end plate cooperates with the conductor slots to form passages between axially opposite end faces through the rotor, and
  interlocking means for joining the sheets and the end plate to form one single rotor core component.

In particular, the punching means for making the sheets and the punching means for making the end plate may be split into partial sets of punching means, wherein one set could punch out the conductor openings. For this purpose, the same punching means could be used for making the sheets and for making the end plate. Another partial set of punching means could punch out the magnet openings in the sheets, and yet another partial set of punching means could punch out apertures in the end plate for reducing short circuiting of the magnets.

In a third aspect, the invention provides a method of making a rotor, wherein a core is formed by interlocking plates of a sheet material, wherein each plate in the stack comprises conductor openings and magnet openings to form longitudinally extending conductor slots and magnet slots, and wherein an end plate of the stack is formed with corresponding conductor openings and introduced into the stack as a first or last plate in the lamination of the stack with the conductor openings in communication with the conductor slots to enable subsequent moulding of short circuit rings interconnected by conductors which are moulded through the conductor slots and thus through the end conductor opening of the end plate. According to the method, the end plate could be formed and introduced into the stack in an interlocking process in which also the remaining part of the core is made.

After the core and the end plate have been made, the squirrel cage is made e.g. by arranging the core in a mould of an injection moulding machine in which an electrically conductive material is injected to form substantially longitudinally extending conductors in one piece with two axially oppositely located short circuit rings.

BRIEF DESCRIPTION OF THE DRAWINGS

In the following, a preferred embodiment of the invention will be described in further details with reference to the drawing in which.

DETAILED DESCRIPTION OF THE INVENTION

Figure 1:
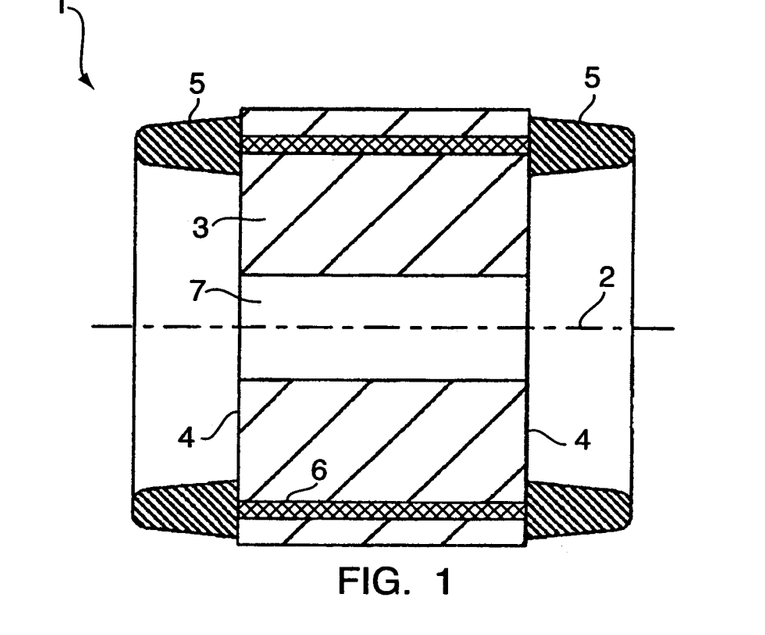
FIG. 1 shows a rotor according to the invention.

FIG. 1 shows a rotor 1 which is carried in a stator for rotation around the centre axis 2. The rotor comprises a rotor core 3 with first and second axially opposite end-faces 4. The rotor further comprises first and second axially opposite short circuit rings 5 which join the axially extending windings 6. The rotor is assembled with a drive shaft (not shown) which extends through the opening 7 and which is suspended in rotational bearings to enable rotation of the rotor relative to a corresponding stator (not shown). The rotor is made from sheets of a metal which is stacked to form a laminated core. Each sheet comprises an opening which, in combination with other sheets, forms conductor slots extending axially throughout the rotor. After the assembly of the sheets into a rotor core, conductive bars, constituting the windings, are moulded directly into the conductor slots using the slots as a mould, and the short circuit rings are moulded as an integral part of the bars. To increase the speed of the rotor, the rotor comprises 6 permanent magnets, i.e. the rotor is for a line-start motor.

Figure 2:
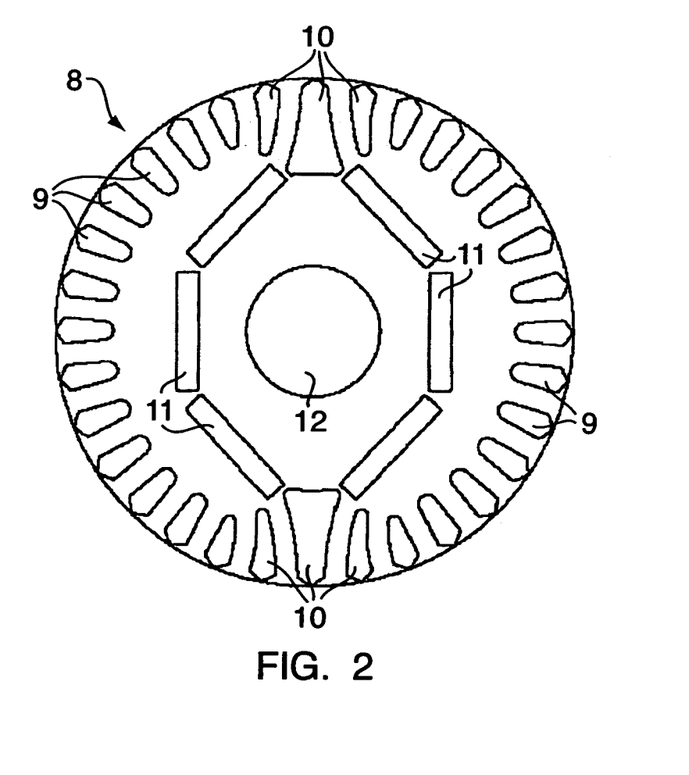
FIG. 2 shows a view of a plate for a rotor stack.

FIG. 2 shows a top view of one type of the metal sheets 8 in the rotor stack in which the openings 9 form part of the conductor slots when a plurality of sheets are stacked to form the laminated rotor structure. At two radially opposite locations, the conductor slots 10 are longer and wider to form a barrier for the magnetic flux. In the assembled state, the rectangular openings 11 form magnet slots for permanent magnets which are inserted into openings in one of the two axially opposite end-faces of the rotor to form a line start motor. The centre-opening 12 forms part of the axially extending opening through the rotor for the drive shaft.

Figure 3:
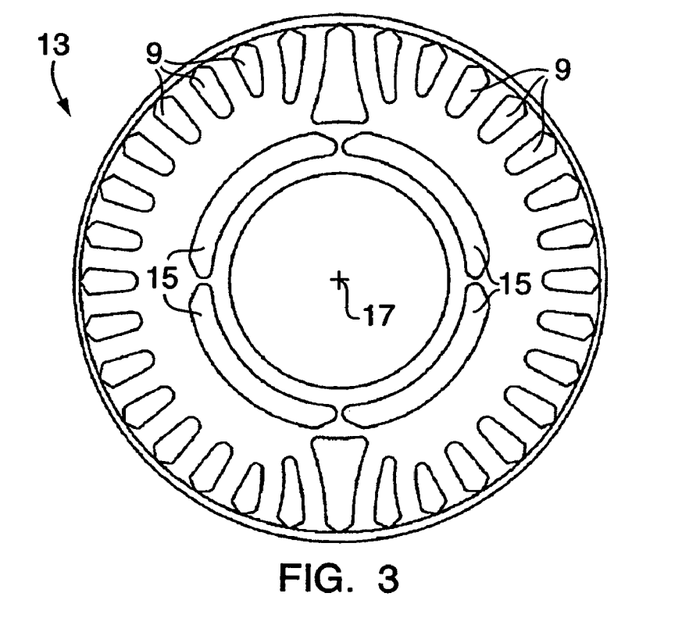
FIGS. 3-6 show three different embodiments of end plates.
Figure 4:
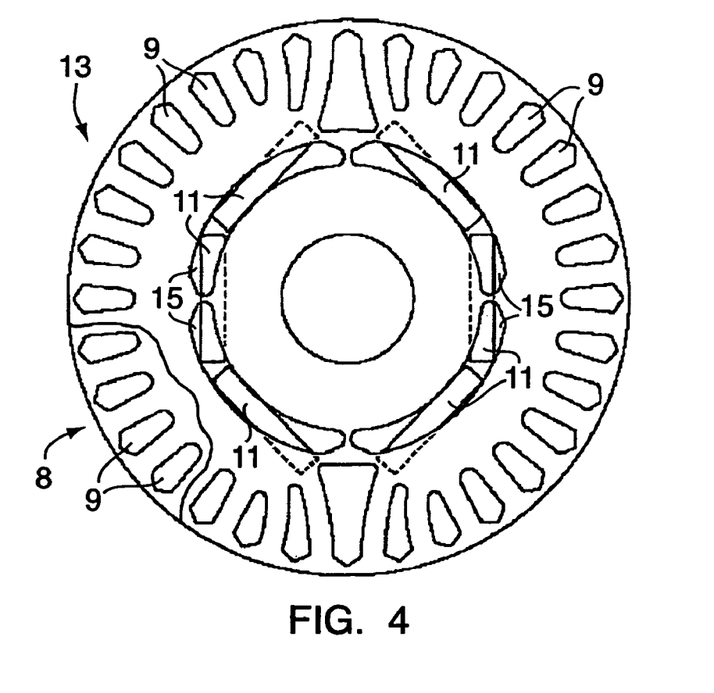

FIGS. 3-6 show three different embodiments of end plates 13, 14, 19. The end plate form part of the rotor stack, and terminates one of the axially opposite end faces thereof. The objective of the end plate is to secure the magnets in the magnet slots. To keep the manufacturing costs as low as possible, the end plate is made from the same material as other plates of the rotor stack, namely a magnetically conductive material. In that way, all the plates in the rotor can be produced and attached to the rotor stack in one integrated interlocking process. In order not to short-circuit the magnets, apertures 15, 16 are located in communication with the openings into the magnet slots. In order to secure the magnets in the slots, the apertures in the end plates are non-congruent with respect to the openings into the magnet slots. In FIG. 3, the apertures 15 are arc-shaped, and they are symmetrically located around the centre 17 of the end plate. In FIG. 4, the end plate 13 is shown in combination with a rotor with rectangular openings 11 into the magnet slots.

Figure 5:
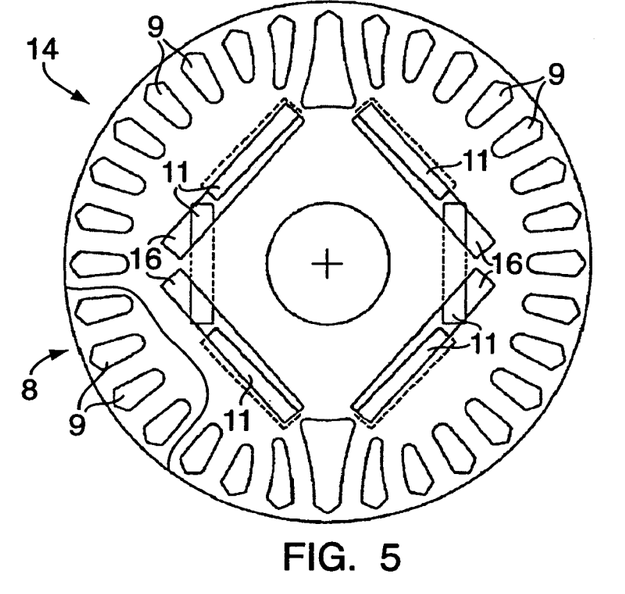
Figure 6:
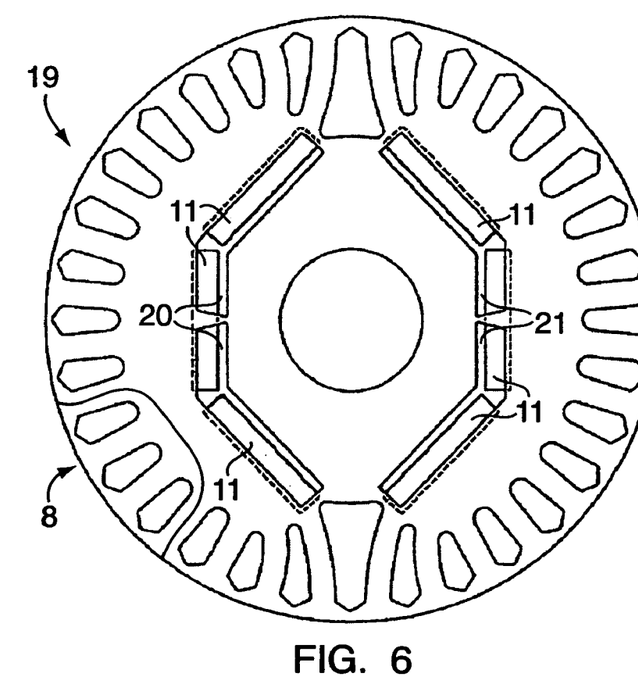

In FIG. 5, the end plate is shown above the end of the rotor, i.e. the locations of the apertures 16 in the end plate are visible relative to the openings into the magnet slots. The rotor is provided with 6 rectangular openings into the magnet slots, and the end plate is provided with 4 rectangular apertures each of which has a larger opening area than the opening area of each the magnet slots. The magnets are secured by the non-congruent shape and location of the apertures in the end plate relative to the openings into the magnet slots In FIG. 6, the end plate 19 comprises only two apertures 20, 21 each having a shape which corresponds to the outer contour of three openings into the magnet slots. The apertures 20, 21 are, however, staggered relative to the openings into the magnet slots thereby to secure the magnets in the slots.

Figure 7:
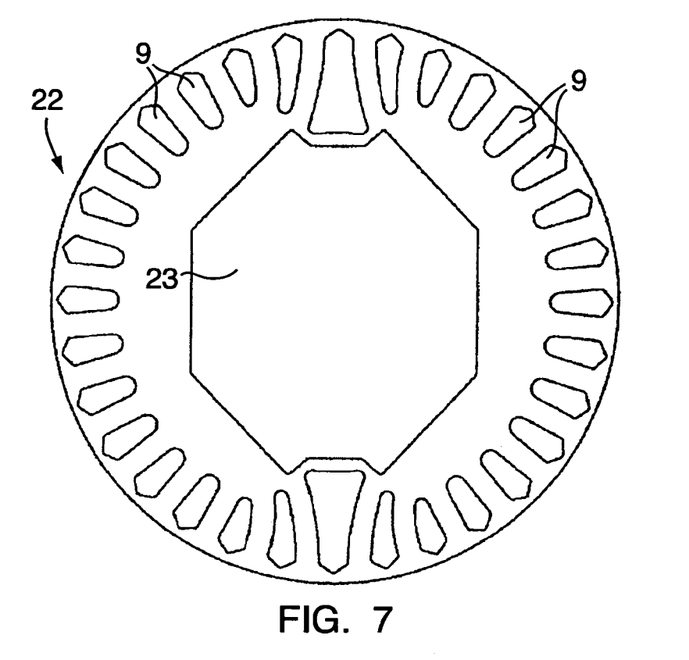
FIGS. 7-10 show two alternative embodiments of end plates.
Figure 8:
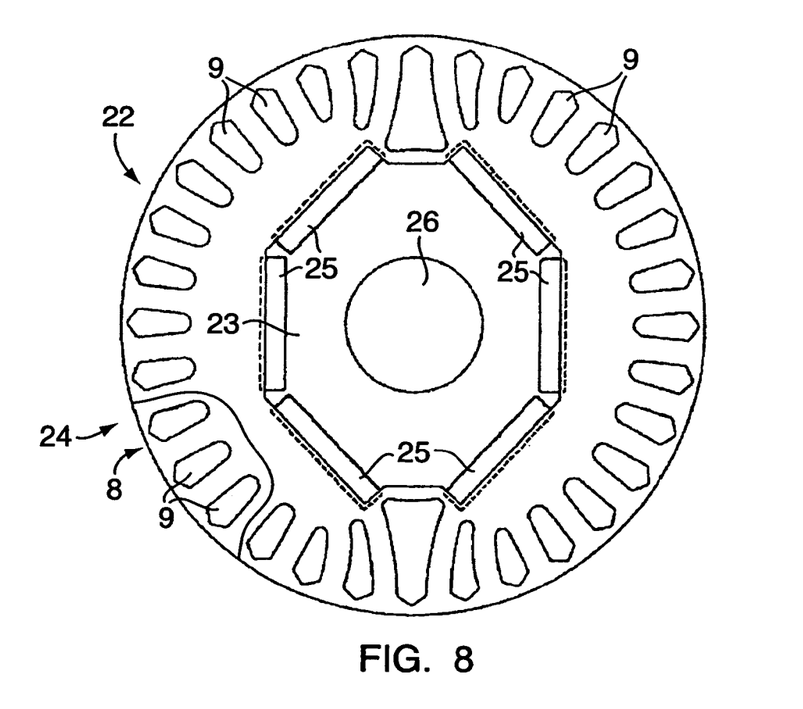

In FIG. 7, the end plate 22 comprises in addition to the conductor openings 9, only one large opening 23. FIG. 8 shows the end plate when it is fitted to a rotor 24. The peripheral edge of the opening 23 covers an edge portion of the magnets 25 to secure the magnets in the rotor. The opening 26 for the rotor axle is not affected by the end plate.

Figure 9:
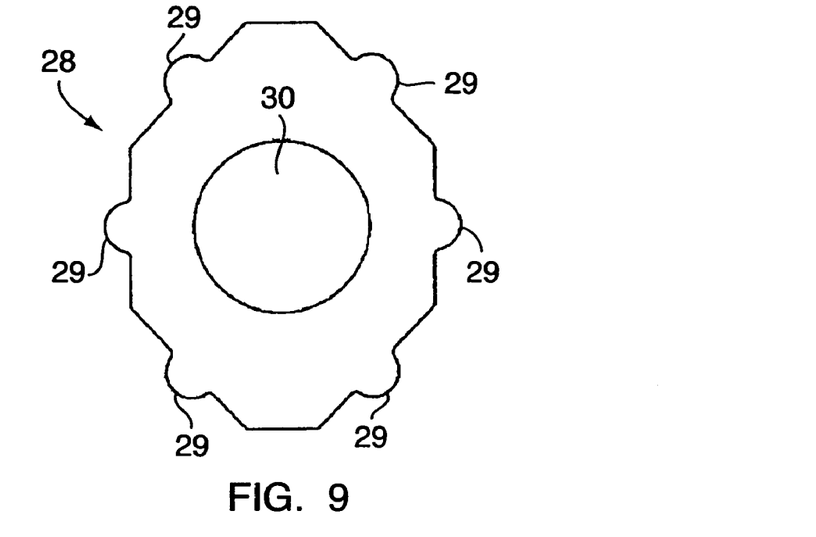
Figure 10:
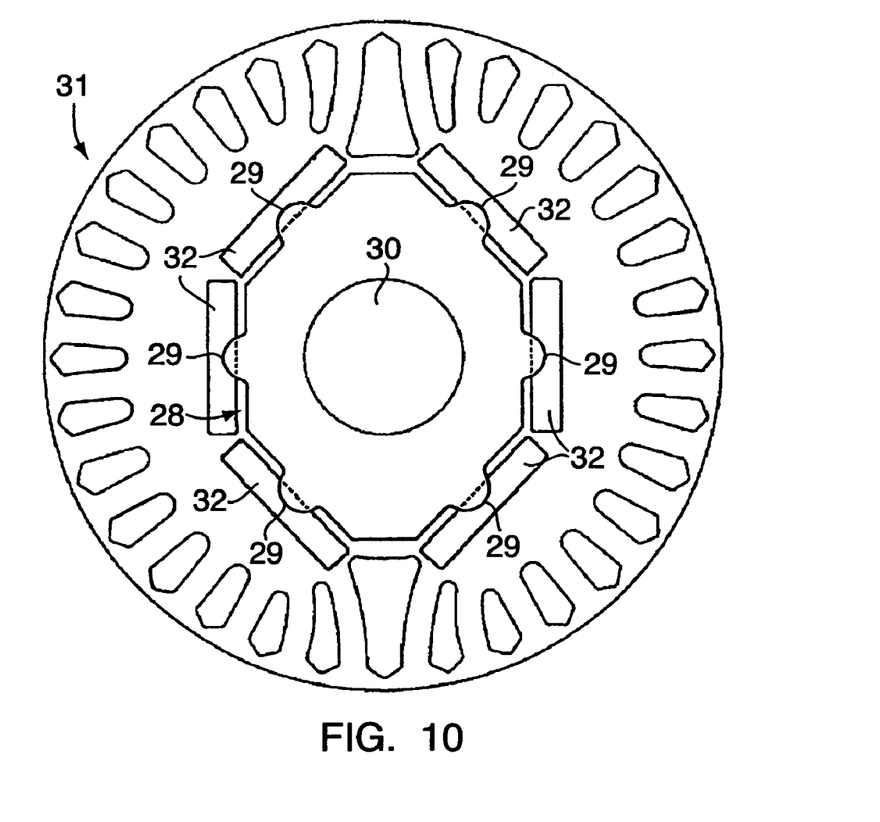

In FIG. 9, the end plate comprises a smaller body part 28 with radially outwardly extending protrusions 29, and with an opening 30 for the rotor axle. In FIG. 10, the end plate is affixed to the rotor 31 and the protrusions 29 cover peripheral portions of the magnets 32 to secure the magnets in the rotor.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A rotor for an electrical motor, the rotor comprising:
a core made from a stack of sheets each comprising conductor openings and magnet openings which, in combination with corresponding openings of the other sheets in the stack, form conductor slots and magnet slots extending between first and second axially opposite end faces of the rotor,
an end plate which is provided with an aperture,
wherein the aperture is larger than the magnet openings, and the end plate is indexed relative to the magnet slots such that a first portion of openings into the magnet slots is in communication with the aperture and such that a remaining, second, portion of the magnet slots is covered by the end plate.

2. The rotor according to claim 1, further comprising a squirrel cage comprising axially oppositely located short circuit rings connected by conductors moulded into the conductor slots, and wherein the end plate comprises conductor openings which cooperate with the conductor slots to allow the conductors to extend through the conductor openings of the end plate.

3. The rotor according to claim 1, wherein the aperture are arched.

4. The rotor according to claim 3, wherein the aperture is provided such that the first portion of the opening into the cavity is in communication with the aperture and such that the remaining, second, portion of the cavity is covered by the end plate to secure the magnet in the cavity independently upon the orientation of the end plate around the centre axis.

5. The rotor according to claim 1, wherein the end plate is joined with the sheets by interlocking.

6. The rotor according to claim 1, wherein the sheets and the end plate is made from the same sheet material.

7. An interlocking tool for making a rotor, said tool comprising:
punching means for making sheets each comprising conductor openings and magnet openings,
punching means for making an end plate,
stacking means adapted to:
stack the sheets such that the conductor openings and magnet openings of a plurality of sheets in combination form condudor slots and magnet slots extending between first and second axially opposite end faces of the rotor, and
position the end plate at one end face of the stack of sheets such that a first portion of openings into the magnet slots is in communication with the aperture and such that a remaining, second, portion of the magnet slots is covered by the end plate.

8. The interlocking tool according to claim 7 wherein the punching means for making the end plate comprises means for making conductor openings in the end plate, and wherein the stacking means further comprises means for joining the sheets and the end plate to form one single rotor core component.

9. A method of making a rotor, wherein a core is formed by interlocking plates of a sheet material, wherein each plate in the stack comprises condudor openings and magnet openings to form longitudinally extending condudor slots and magnet slots, and wherein an end plate of the stack is formed with an aperture positioned such that a first portion of openings into the magnet slots is in communication with the aperture and such that a remaining, second, portion of the magnet slots is covered by the end plate.

10. The method according to claim 9, wherein the sheets and the end plate is produced and staked to form one single rotor core component in an interlocking process.

* * * * *

UNITED STATES PATENT AND TRADEMARK OFFICE
CERTIFICATE OF CORRECTION

PATENT NO. : 7,365,466 B2
APPLICATION NO. : 11/311597
DATED : April 29, 2008
INVENTOR(S) : Niels Christian Weihrauch et al.

It is certified that error appears in the above-identified patent and that said Letters Patent is hereby corrected as shown below:

Column 6, claim 4, line 14 please delete the word "dalm" and replace with the word --claim--.

Column 6, claim 9, line 49 please delete the word "condudor" and replace with the word --conductor--.

Signed and Sealed this

Twenty-second Day of July, 2008

JON W. DUDAS
*Director of the United States Patent and Trademark Office*